(12) United States Patent
Gulati et al.

(10) Patent No.: US 11,797,958 B2
(45) Date of Patent: Oct. 24, 2023

(54) PAYMENT ALERT SYSTEM AND TECHNIQUES BASED ON GEOGRAPHIC FOOTPRINT

(71) Applicant: Capital One Services, LLC, McLean, VA (US)

(72) Inventors: Latika Gulati, Annandale, VA (US); Joshua Edwards, Philadelphia, PA (US); Lukiih Cuan, Washington, DC (US)

(*) Notice: Subject to any disclaimer, the term of this patent is extended or adjusted under 35 U.S.C. 154(b) by 0 days.

(21) Appl. No.: 17/336,942

(22) Filed: Jun. 2, 2021

(65) Prior Publication Data
US 2022/0391865 A1    Dec. 8, 2022

(51) Int. Cl.
| | | |
|---|---|---|
| *G06Q 20/00* | (2012.01) | |
| *G06Q 20/10* | (2012.01) | |
| *G06Q 50/06* | (2012.01) | |
| *G06Q 20/38* | (2012.01) | |
| *G06Q 20/40* | (2012.01) | |

(52) U.S. Cl.
CPC ........ *G06Q 20/102* (2013.01); *G06Q 20/389* (2013.01); *G06Q 20/4015* (2020.05); *G06Q 50/06* (2013.01)

(58) Field of Classification Search
CPC ........ G06Q 20/10; G06Q 20/38; G06Q 20/40; G06Q 20/102; G06Q 20/389; G06Q 20/4015; G06Q 50/06
USPC ................................................. 705/4, 35–45
See application file for complete search history.

(56) References Cited

U.S. PATENT DOCUMENTS

| | | | |
|---|---|---|---|
| 7,467,092 B2 | 12/2008 | Anderson et al. | |
| 8,738,477 B2 | 5/2014 | Lefebvre et al. | |
| 2002/0026394 A1* | 2/2002 | Savage ................. | G06Q 20/02 705/34 |
| 2012/0078781 A1* | 3/2012 | Ross ..................... | G06Q 40/02 705/40 |
| 2015/0193750 A1* | 7/2015 | Ivanoff ................. | G06Q 40/03 705/40 |
| 2015/0332292 A1* | 11/2015 | Unser ................... | G06Q 30/02 705/7.31 |

* cited by examiner

*Primary Examiner* — Jessica Lemieux
*Assistant Examiner* — Mohammed H Mustafa
(74) *Attorney, Agent, or Firm* — KDW Firm PLLC

(57) ABSTRACT

A non-transitory computer-readable storage medium storing computer-readable program code executable by a processor to retrieve a customer data record including bill payment activity associated with a provider account for a customer of a financial institution; and define a geographical footprint for the customer. The geographical footprint may be defined by identifying a customer set including the customer from a plurality of customers of a provider of the provider account, having customer records indicating geographic proximity, and determining that a predetermined fraction of the customer set are associated with a common billing cycle for the provider. The computer-readable program code may be executable by the processor to send a bill payment alert for transmission to the customer via electronic communication or telephonic communication, when the bill payment activity meets a threshold condition, wherein the threshold condition is determined at least in part by the geographical footprint.

20 Claims, 7 Drawing Sheets

PAYMENT ALERT SYSTEM AND TECHNIQUES BASED ON GEOGRAPHIC FOOTPRINT

TECHNICAL FIELD

Embodiments herein generally relate to electronic payment, and more specifically, to automated bill management.

BACKGROUND

Customers such as customers of a utility or other service provider may often maintain service accounts, whose bills may be paid by the customer via a financial institution such as a bank or other financial institution associated with the customer. One advantage of using a financial institution to facilitate bill payments to a service provider is that bill payment may be performed in an automatic manner. However, bill payment for a utility customer may still be missed under different scenarios. When a customer relocates to a new address, for example, payment for service providers such as utilities may need to be reset. Under these circumstances mistakes may lead to missed utility payments, where the customer may be unaware that bill payment is due before a bill due date has already passed.

With respect to these and other considerations, the present disclosure is provided.

BRIEF SUMMARY

In one embodiment, a non-transitory computer-readable storage medium storing computer-readable program code executable by a processor to: retrieve a customer data record including bill payment activity associated with a provider account for a customer of a financial institution, and define a geographical footprint for the customer. The geographical footprint for the customer may be defined by identifying a customer set including the customer from a plurality of customers of a provider of the provider account, having customer records indicating geographic proximity, and determining that a predetermined fraction of the customer set are associated with a common billing cycle for the provider. The computer-readable program code may be executable by the processor to send a bill payment alert for transmission to the customer via a communications interface, when the bill payment activity meets a threshold condition, wherein the threshold condition is determined at least in part by the geographical footprint.

In another embodiment, a method of managing bill payments may include retrieving a customer data record including bill payment activity associated with a provider account for a customer of a financial institution, and defining a geographical footprint of the customer. The geographical footprint of the customer may be defined by identifying a customer set including the customer, from a plurality of customers of a provider of the provider account, having customer records indicating geographic proximity with one another, and determining that a predetermined fraction of the customer set are associated with a common billing cycle for the provider. The method may also include generating a bill payment alert when the bill payment activity meets a threshold condition, wherein the threshold condition is determined at least in part by the geographical footprint.

In another embodiment, a system may include a processor, and a memory storing instructions executable by the processor to periodically retrieve a customer data record including bill payment activity associated with a provider account for a customer of a financial institution and define a geographical footprint for the customer. The geographical footprint may be determined by identifying a customer set including the customer from a plurality of customers of a provider of the provider account, having customer records indicating geographic proximity; and determining that a predetermined fraction of the customer set are associated with a common billing cycle for the provider. The instructions may be executable by the processor to generate a bill payment alert for transmission to the customer via a communications interface, when the bill payment activity meets a threshold condition, wherein the threshold condition is determined at least in part by the geographical footprint.

Figure 3A:
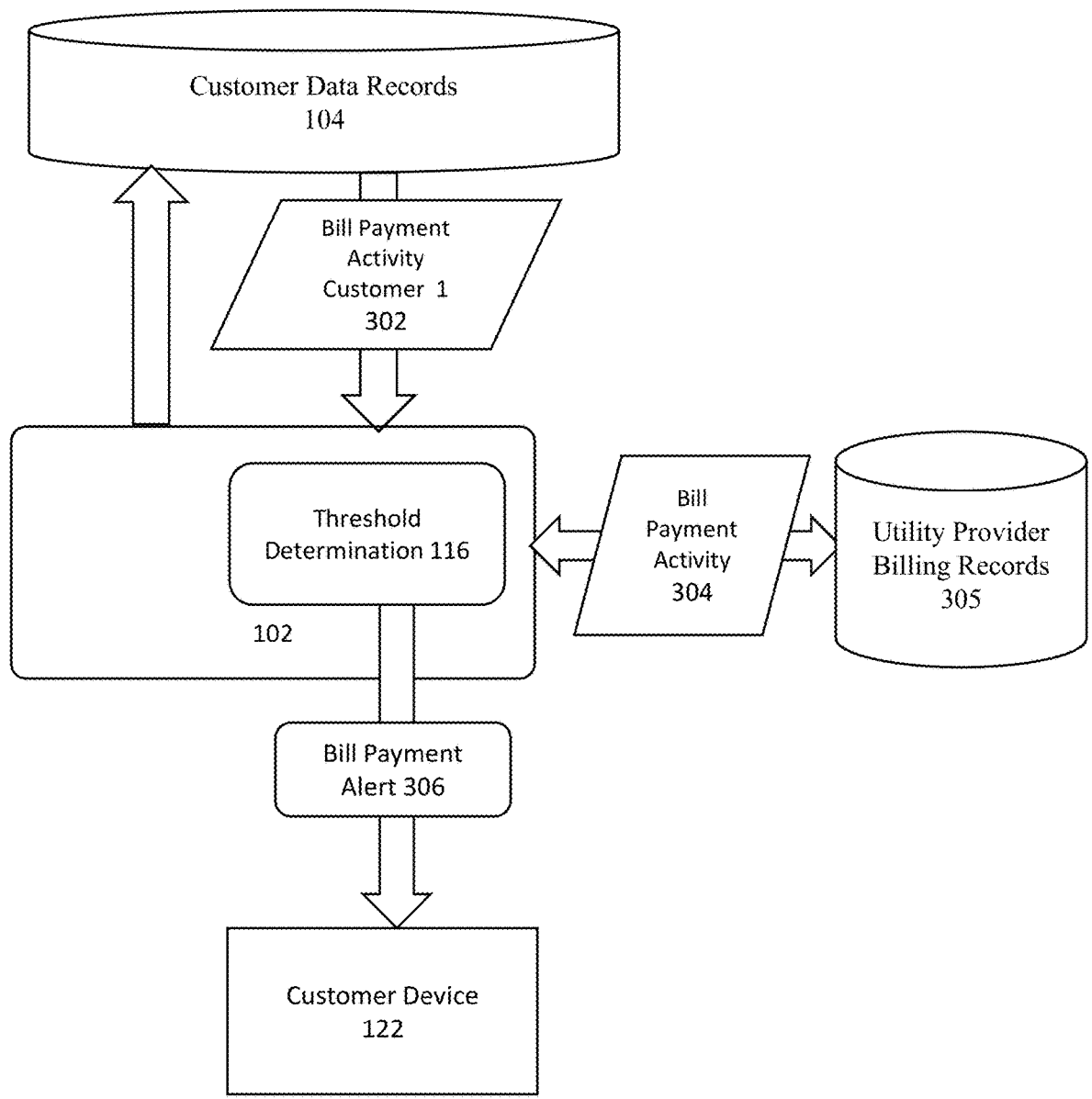
FIG. 3A illustrates another scenario for operation of the system of FIG. 1.
Figure 3B:
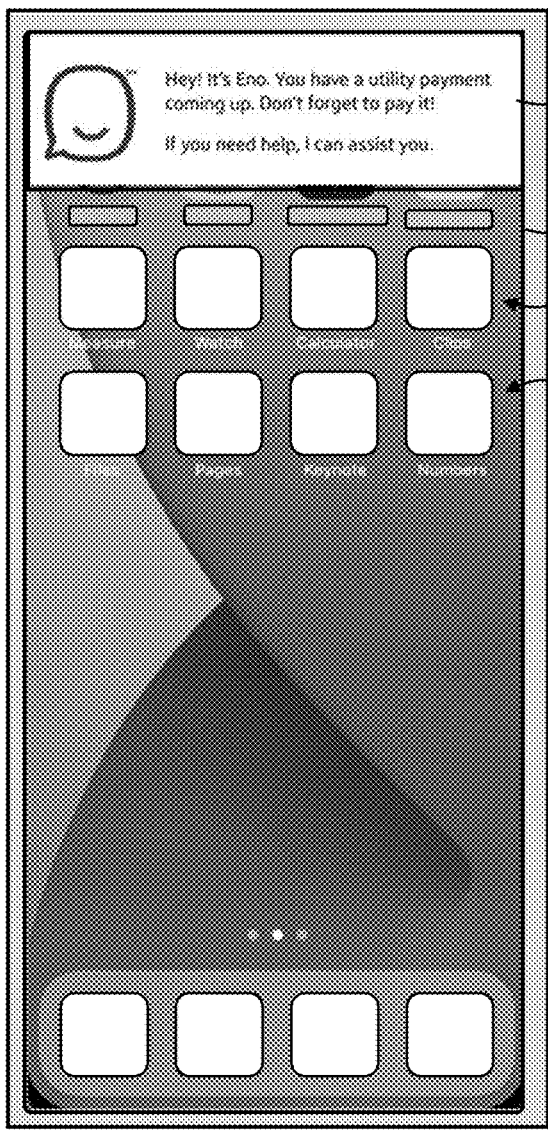
FIG. 3B presents an implementation of a variant of the bill payment alert, according to embodiments of the disclosure.

In the implementation of FIG. 3B, the bill payment alert 306 is generated as a popup icon that appears on a user interface 310 of the customer device 122. The user interface 310 may be a screen that includes icons 312, representing various apps. The bill payment alert 306 may be implemented in software, such as an app that is provided to a user of the customer device 122 as part of the bill payment alert system 100. Thus, the bill payment alert 306 will appear as a popup when the bill payment alert apparatus 102 determines that the customer of customer device 122 should be alerted.

According to embodiments of the disclosure, upon receiving the bill payment alert 306, the user of customer device 122 may engage the bill payment alert system 100 to select different options for payment.

DETAILED DESCRIPTION

Embodiments disclosed herein provide a system and techniques to facilitate bill payment for a customer of a financial institution. The bill payment may relate bills for a provider account that is related to the customer.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

Figure 1:
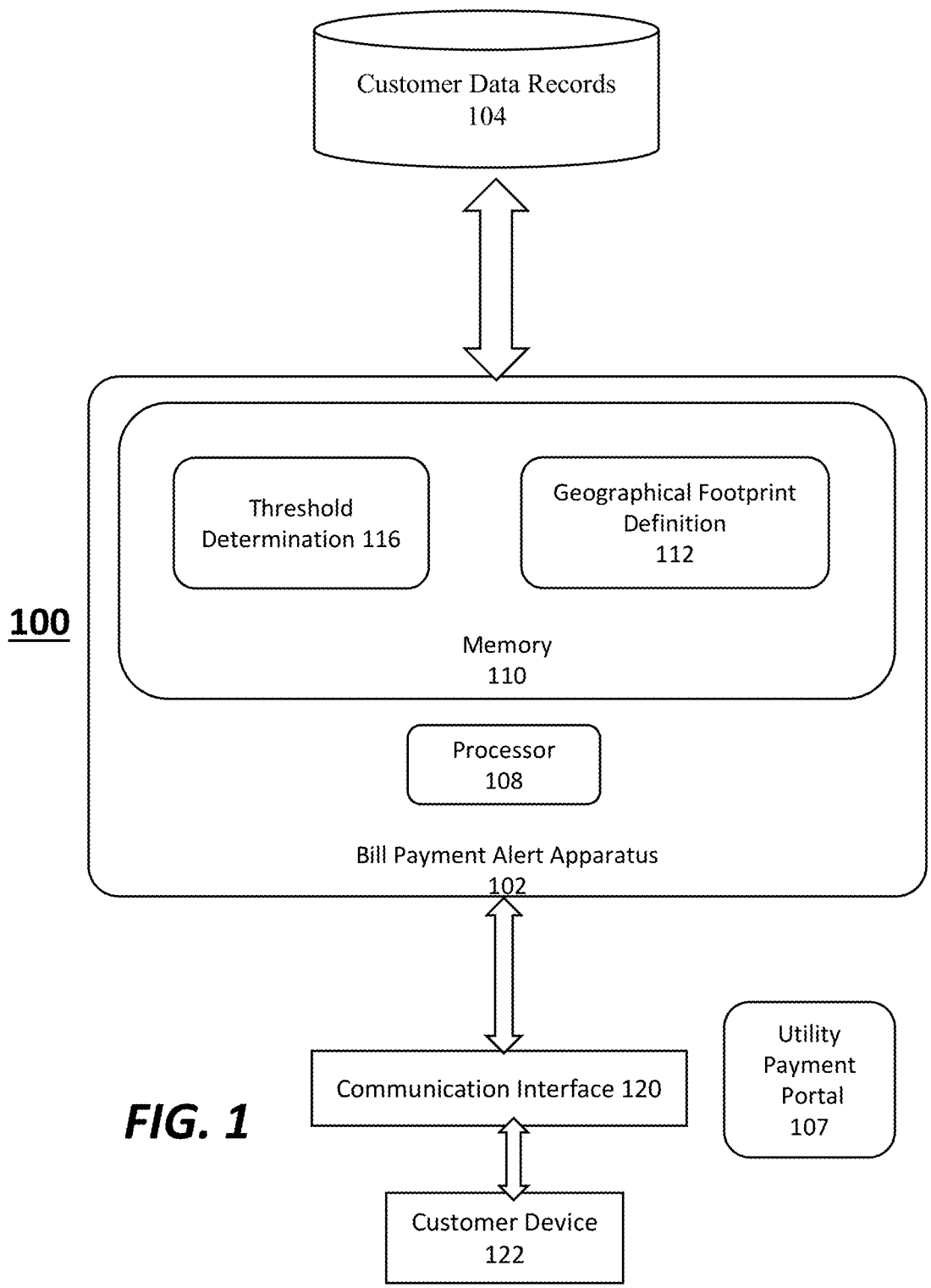
FIG. 1 illustrates an embodiment of a system.

FIG. 1 depicts a schematic of an exemplary system, labeled a bill payment alert system 100, consistent with disclosed embodiments. The bill payment alert system 100 may represent an assembly of different systems and/or devices, including user devices, vendor devices or systems, and financial provider systems and/or devices. The embodiments are not limited in this context, however. The bill payment alert system 100 may facilitate bill payment for a service provider customer, such as a customer of a utility. In the configuration of FIG. 1, a bill payment alert apparatus 102 is deployed to alert a customer, such as a user of the customer device 122. Alert to the customer device 122 may take place via a communications interface 120. As shown in FIG. 1, the bill payment alert apparatus 102 may be linked to a storage device, such as a computer readable storage medium, including a set of customer data records, associated with the customer of customer device 122.

In one implementation, the bill payment alert apparatus 102 may act as a payment portal for a customer associated with the customer device 122. As an example, the bill payment alert apparatus 102 may receive, retrieve, and/or store customer information related to at least one utility for the customer of customer device 122. As such, information such as payment activity for utility providers to the customer of customer device 122 may be stored and monitored, in a manner to facilitate more effective management of utilities associated with the customer of customer device 122. In the example of FIG. 1, customer information, such as bill payment activity, may be communicated using customer device 122 to communicate to and from the bill payment alert apparatus 102, via communication interface 120, which interface may represent an audio interface, electronic interface, text interface, chatbot, data interface, internet website, smartphone application, or other suitable interface. Note that information may be communicated between a customer and bill payment portal or alert apparatus by other mechanisms, such as by mail.

In particular, the customer associated with the customer device 122 may enroll with the bill payment alert system 100 via a utility payment portal 107, in order to maintain accounts with a service provider where at least some account activity associated with the service provider, such as a utility provider, is maintained in the customer data records 104. For example, the customer data records 104 may include bill payment activity for a provider account such as a utility for the customer of customer device 122. Moreover, according to embodiments of the disclosure, the customer associated with the customer device 122 may be a customer of a financial institution that owns or maintains the bill payment alert apparatus 102 and customer data records 104. As such, the financial institution may manage or monitor at least a portion of the customer activity associated with a provider account of a service provider for the customer of customer device 122. In various scenarios, detailed with respect to the embodiments to follow, bill payment activity associated with a provider account may be facilitated via alerts that are automatically generated and sent to the customer device 122. In brief, the generation of bill payment alerts to the customer device 122 may be based upon a geographical footprint associated with the customer of customer device 122.

In the example of FIG. 1 the bill payment alert apparatus 102 includes a processor 108, such as a microprocessor, and memory 110, where the memory 110 may be any suitable computer readable memory, including a non-transitory storage medium. The memory 110 may include various routines or applications, including instructions for executing bill payment alert. A routine may also be referred to as a component, where the memory 110 may include a geographical footprint determination component 112 and a threshold determination component 116. The processor 108 may operate upon both of these components to determine when to send a bill payment alert to the customer of customer device 122, based upon a geographical footprint associated with the customer and a threshold condition being met.

Figure 2:
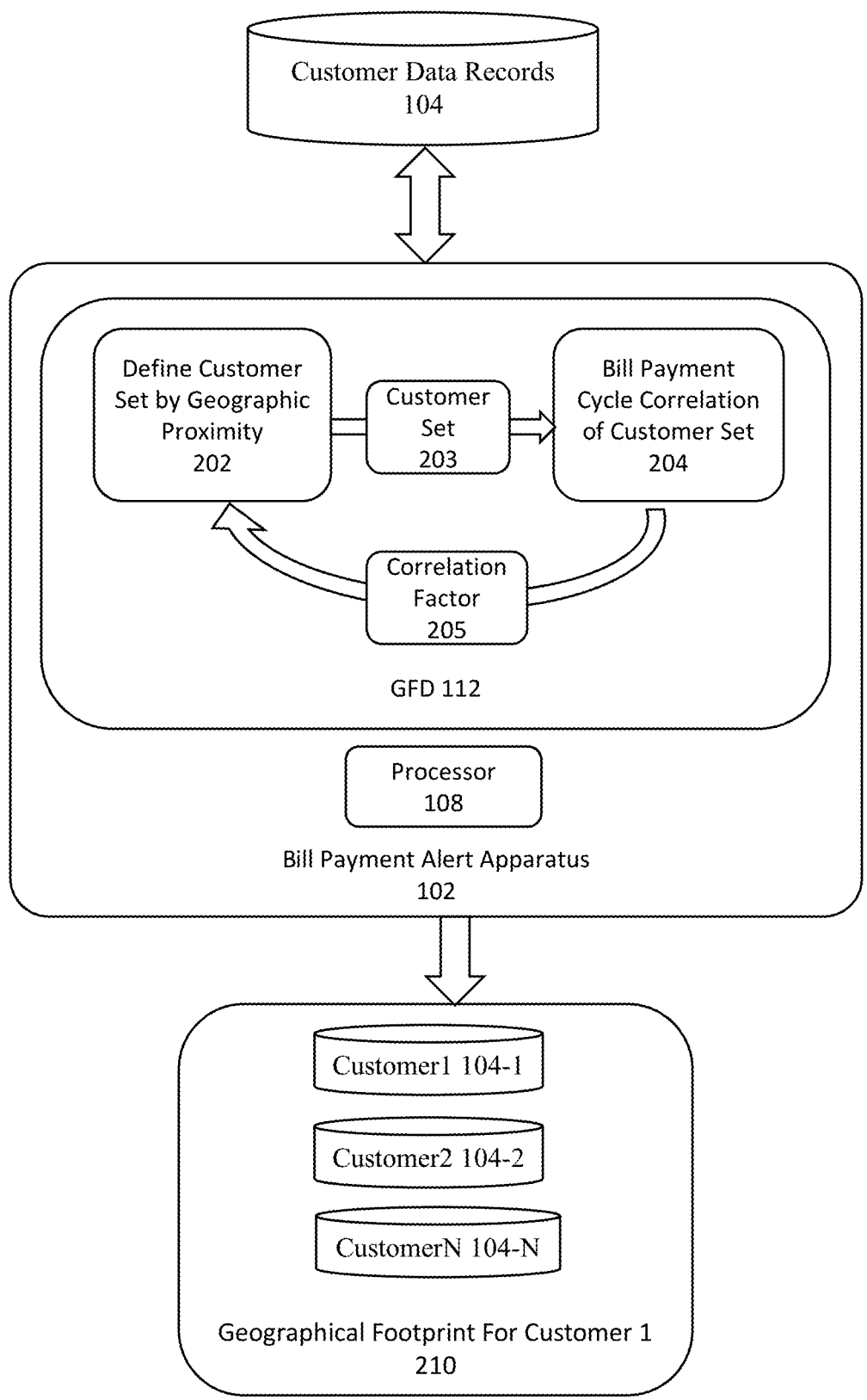
FIG. 2 illustrates one scenario for operation of system of FIG. 1.

FIG. 2 illustrates one scenario for operation of the bill payment alert apparatus 102 the system of FIG. 1. In this scenario the geographical footprint determination component 112 of the bill payment alert apparatus 102 generates an entity termed a geographical footprint 210, where the geographical footprint 210 is shown for a customer1 104-1. The geographical footprint 210 may correspond to a geographical address of customer1, and may be determined according to different approaches. As illustrated in FIG. 2, the geographical footprint 210 may be associated with multiple customers, shown as Customer1 104-1, Customer2 104-2, CustomerN 104-N, etc. Once a geographical address of customer1 is determined, a geographical block may be identified that corresponds to the geographical location proximate that location of Customer1. In one approach the size of the geographical footprint 210 may include at least 10 customers, while in other approaches, the size of the geographical footprint may include may more customers, such as hundreds of customers.

The geographical footprint 210 may be determined at least in part by interrogation of customer records of service provider customers accessible to the bill payment alert apparatus 102, such as customers of a financial institution. For example, the geographical footprint 210 may be generated by selecting a predetermined geographical region of block, located proximate to the customer1.

In some examples, the geographical footprint 210 may be determined using a machine learning algorithm or similar components to determine the appropriate size for the geographical footprint 210. In particular, in the example of FIG. 2, the geographical footprint determination component 112 includes multiple components for iteratively determining a geographical footprint based upon customer records. In the particular example of FIG. 2, a component or geographic proximity routine 202 defines an initial customer set by geographical proximity to one another, corresponding to a group of customers within a given geographical location, including customer1, for example. The customer set 203, may be, for example, a predetermined number of customers located geographically proximate to customer1.

In the example of FIG. 2 the geographical footprint determination component 112 may be set to determine the geographic footprint 210 based upon a correlation of coherence criterion of the customer set 203. For example, the coherence criterion may be that 90% of the customers of the customer set 203 pay bills to a same utility provider as customer1, according to a common billing cycle. Non-limiting examples of a utility provider include an electric utility, a gas utility, a water utility, or an oil utility, or phone service.

A correlation component 204 may receive the customer set 203 and determine a correlation factor by performing correlation of bill payments of a customer set. For example, the correlation component 204 may retrieve customer records associated with the customer set 203 to determine that 90% of the customers of the customer set 203 pay bills to the same utility provider as customer1, according to a common billing cycle. As a result, the correlation component 204 may return a correlation factor 205 to the geographic proximity routine 202, indicating that 90% of the customers of the customer set 203 pay their bills at the first of every given month.

As such, because the bill payment behavior in the customer set 203 is over correlated, the geographic proximity routine 202 may be triggered to increase the size of the customer set 203 by expanding the number of customers located proximate to the customer1. In the particular example of FIG. 2, the geographic proximity routine 202 may output a larger version of customer set 203, containing larger numbers of customers, to the correlation component 204. With the new iteration of customer set 203, the correlation component 204 may determine that indicating that 81% of the customers of the customer set 203 pay their bills at the first of every given month. When the correlation component 204 returns a correlation factor 205 having a value of 81%, the geographical footprint determination component 112 may determine that the current version of the customer set 203 is suitable to store as a geographical footprint 210. While the example of FIG. 2 depicts separate components for determining the geographical footprint 210, in some embodiments a single component or algorithm may be employed to perform the aforementioned operations for determining the geographical footprint 210.

FIG. 3A illustrates another scenario for operation of the system of FIG. 1. In this example, the bill payment alert apparatus 102 generates a bill payment alert 306, and may send the bill payment alert 306 to the customer device 122. According to various non-limiting embodiments, the bill payment alert 306 may be embodied text, audio, a visible indicator, or other mechanism that alerts the customer that payment is due to a utility provider, for example. In embodiments, the bill payment alert 306 may be communicated in electronic mail (email), as a text message, automated telephone call, in website, via a chatbot, etc. In some embodiments, the customer device 122 may be a laptop computer, desktop computer, tablet device, smart phone, or other suitable device.

In the scenario of FIG. 3A, the bill payment alert 306 may be triggered based upon information retrieved or received by the bill payment alert apparatus 102, including bill payment activity 302, representing bill payment activity for customer1, associated with a given provider, such as a utility provider. The bill payment alert apparatus 102 may also retrieve or receive bill payment activity 304, representing records of bill payment activity associated with customers of the utility provider, located within the geographical footprint 210. For example, the bill payment activity 304 may be retrieved from a database that includes billing transactions and is shown as Utility Provider billing records 305, representing billing records for customers of the utility provider, located within the geographical footprint 210. The bill payment activity 304 may represent payment activity for a given period, such as a current billing period associated with utility provider.

According to an embodiment of the disclosure, the bill payment activity 304 may be retrieved or received by the threshold determination component 116, to determine when a threshold condition is met In this example, a bill payment alert 306 is generated when the bill payment activity 304 meets a threshold condition, where the threshold condition is determined at least in part by the geographical footprint 210. In other words, the bill payment activity 304, used to determine whether a threshold condition is met, is received from a set of records for customers in the geographical footprint 210. When the bill payment activity 304 meets a threshold condition, the bill payment alert apparatus 102 may determine that the customer of customer device 122, as part of the customer group associated with geographical footprint 210 should be alerted, and may according send the bill payment alert 306 to the customer device 122 by any suitable means.

FIG. 3B presents an implementation of a variant of the bill payment alert 306, according to embodiments of the disclosure. In the implementation of FIG. 3B, the bill payment alert 306 is generated as a popup icon that appears on a user interface 310 of the customer device 122. The user interface 310 may be a screen that includes icons 312, representing various apps. The bill payment alert 306 may be implemented in software, such as an app that is provided to a user of the customer device 122 as part of the bill payment alert system 100. Thus, the bill payment alert 306 will appear as a popup when the bill payment alert apparatus 102 determines that the customer of customer device 122 should be alerted.

Figure 3C:
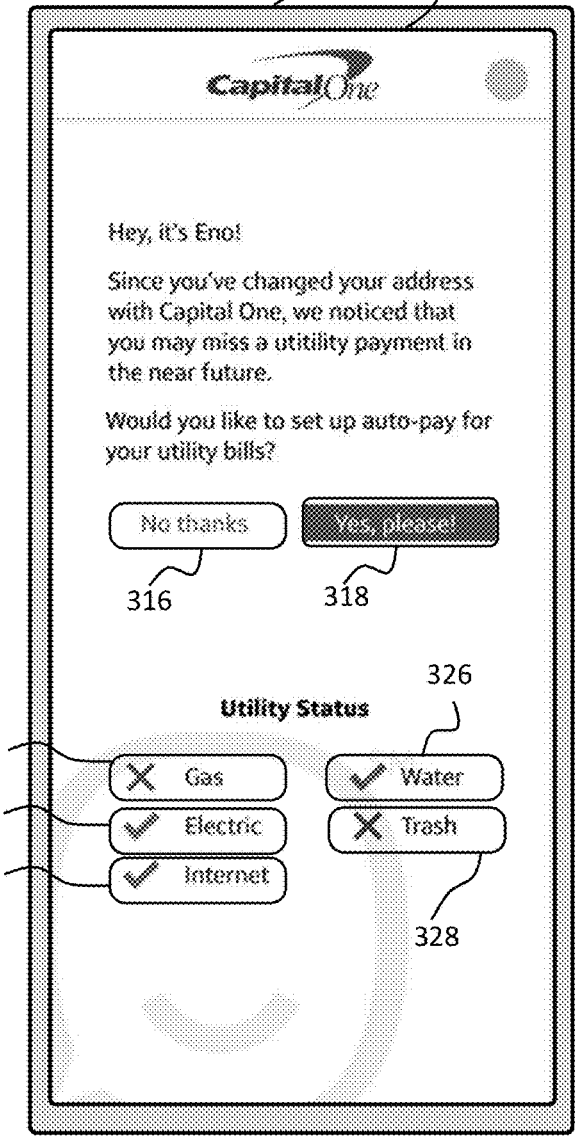
FIG. 3C shows one example of a menu of a bill payment alert system, according to embodiments of the disclosure.

According to embodiments of the disclosure, upon receiving the bill payment alert 306, the user of customer device 122 may engage the bill payment alert system 100 to select different options for payment. Turning to FIG. 3C, there is shown one example of a menu 314 that is invoked as part of an app of the bill payment alert system 100. In this example, the menu is invoked as a result of clicking on the bill payment alert 306 in the user interface 310. However, other mechanisms for invoking a similar menu as to menu 314 are possible. As shown in FIG. 3C, the menu 314 includes a text field that displays bill payment information of relevance to the user of customer device 122, notifying the user that utility bill payment may be missed, and querying the user as to whether automatic bill payment should be set up.

The menu 314 also provide response buttons, shown as No button 316 and YES button 318, as well as additional buttons that are specific to the utilities that may be associated with the user of customer device 122. Thus, if the user desires to set up automatic bill payment, the user may select within the menu 314 which utility bills are to be placed on automatic payment. In the example shown, a Gas utility button 320, an electric utility button 322, an internet utility button 324, water utility button 326, and trash utility button 328. In one scenario, as depicted in FIG. 3C, the user may select electric utility button 322, an internet utility button 324, and water utility button 326, in order to set up automatic bill payment of these utilities, while not selecting the Gas utility button 320, and trash utility button 328. In this case, gas utility bills and trash utility bills for the user of customer device 122 will not be places on automatic payment by the bill payment alert system 100. As further shown in FIG. 3C, the menu 314 may conveniently apprise the user as to the status of auto pay for bill payment of various utilities, such as providing a check icon for those utilities that are set up or to be set up for auto bill pay, and an X icon for those utilities not set of for auto bill pay.

Figure 4:
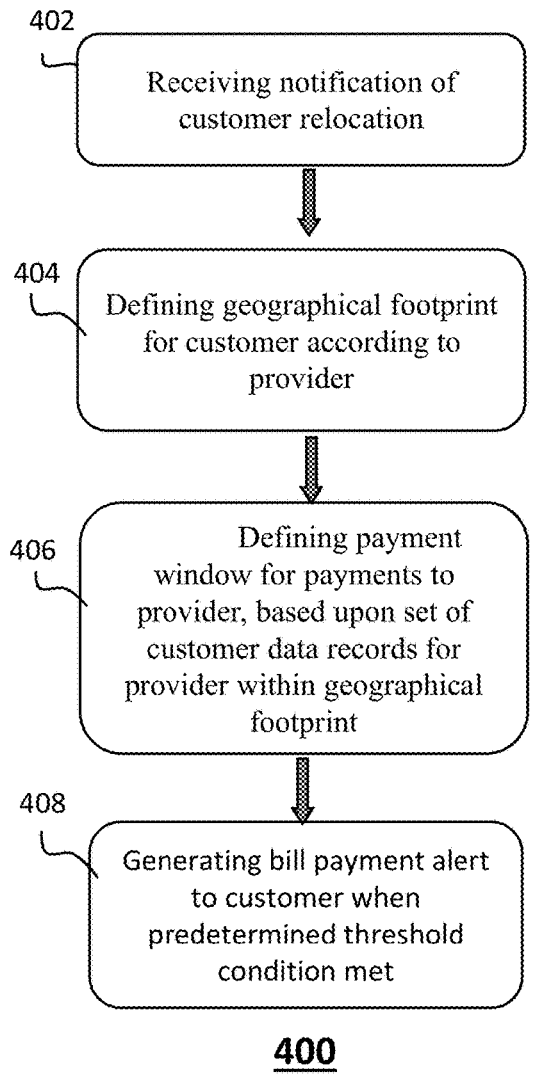
FIG. 4 illustrates an embodiment of a first logic flow.

According to various embodiments, the determination of when to generate a bill payment alert may be performed taking into account various different criteria. FIG. 4 depicts an exemplary logic flow, shown as process flow 400, in accordance with some embodiments of the disclosure. The process flow 400 may be implemented by one or more components of the bill payment alert apparatus 102, discussed above. The process flow 400 may be implemented by a financial services provider, for example, when a customer of a service provider relocates to a different geographical address. At block 402, a notification of relocation of the customer is received. For example, a customer data record may be updated to capture a new address for a customer1. In one example, a customer registered with a payment portal of the bill payment alert system 100 may register a change of address.

At block 404, based upon the new address for customer1, a geographical footprint for the customer1 at the new address is determined. The geographical footprint may be determined according to the procedures as outlined above. The flow then proceeds to block 406.

At block 406, a payment window is defined for payments to a provider. The provider may be a utility provider for the customer1, for example. The payment window maybe determined based upon a set of additional customer data records the for provider within the newly defined geographical footprint, as determined at block 404. For example, referring again to FIG. 3A, customer1 may be a customer of an electric utility, where, at a former address, a regular payment window was set for the last 10 days of a month. When the customer moves, the determination of a new geographical footprint may take place, where the new footprint is represented by the geographical footprint 210. In this circumstance, a set of additional customer data records for additional customers of the electric utility within the location corresponding to the new geographical footprint may indicate that these additional customers exercise a regular payment window during the first 10 days of each month. Thus, upon determination of the new address for customer1, a new payment window for the electric utility is identified, corresponding to the first 10 days of the month.

The flow then proceeds to block 408, where a bill payment alert is generated when a threshold condition is met. According to embodiments of the disclosure, the threshold condition may be linked to the bill payment window, determined at block 406. For example, at a predetermined time before or during a bill payment window, a bill payment alert apparatus may interrogate bill payment activity of the customer1 with respect to the electric utility. When timely payment of a current bill for the electric utility provider has not been made at a predetermined date with respect to the bill payment window, a bill payment alert may then be generated.

Figure 5:
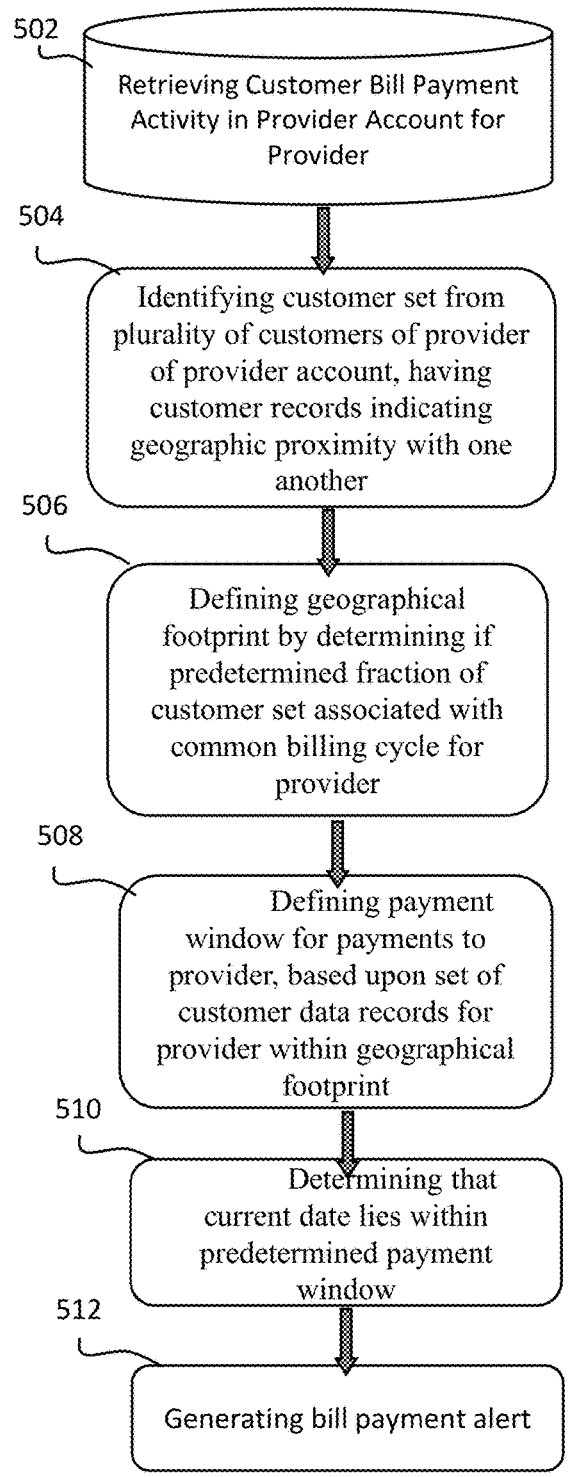
FIG. 5 illustrates an embodiment of a second logic flow.

FIG. 5 depicts an exemplary logic flow, shown as process flow 500, in accordance with some embodiments of the disclosure. The process flow 500 may be implemented by one or more components of the bill payment alert apparatus 102, discussed above. At block 502, a Customer Bill Payment Activity record is retrieved in a Provider Account for a Provider, such as a utility provider. The customer bill payment activity may reflect recent bill payment within a predetermined period of time.

At block 504, a customer set is identified from a plurality of customers for the provider of the provider account of customer1, where the customer set represents customer records indicating geographic proximity with one another. For example, 100 customers of an electric utility with geographic proximity with one another and with customer1 may be flagged.

At block 506, a geographical footprint for customer1 associated with the provider is defined by determining if a predetermined fraction of the customer set for the provider, determined at block 504, is associated with a common billing cycle for the provider.

The flow then proceeds to block 508. At the block 508, a payment window for payments to the provider is defined, based upon a set of customer data records for the provider that lie within the geographical footprint, defined in block 506. In particular, the set of customer records may correspond to all or part of the customers associated with geographical footprint, and may establish a regular payment window for customers on a common billing cycle, when regular payments are due to the provider.

The flow then proceeds to block 510, where a determination that a current date lies within the predetermined payment window, identified at block 508. For example, a system, such as bill payment alert system 100, may periodically interrogate a database, such as Utility Provider billing records 305, periodically, for example, on a daily basis in order to determine whether the current date corresponds lies within a payment window. When the current date does not lie within the predetermined payment window, the process may end. When the current date is determined to lie within the predetermined payment window, the flow proceeds to block 512.

At block 512, a bill payment alert is generated for the customer1 concerning payment due to the provider in question. The bill payment alert may be sent to a customer device, for example, by any suitable method.

Figure 6:
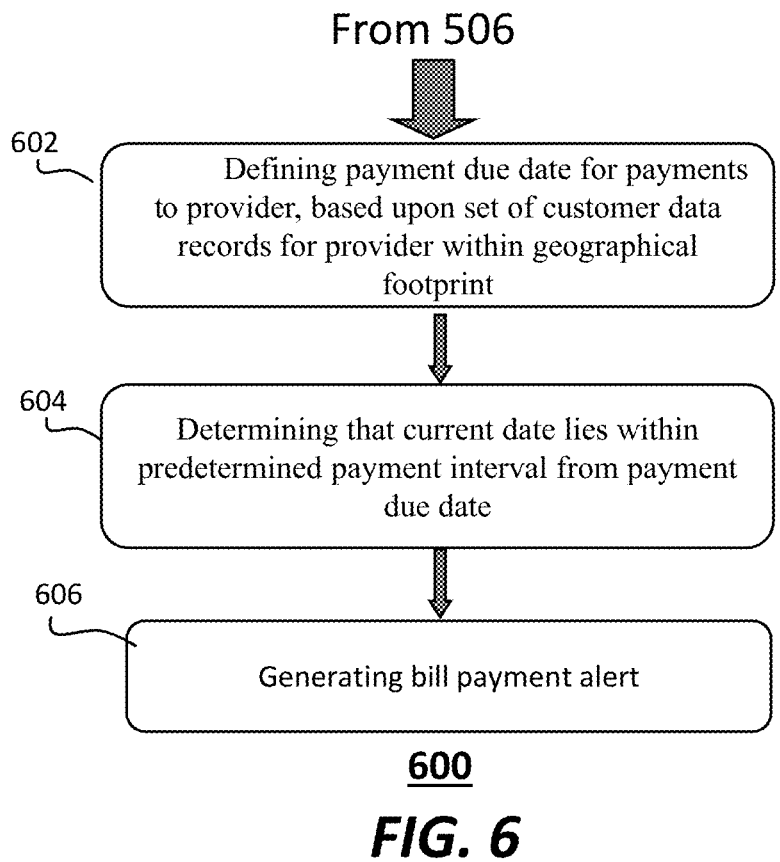
FIG. 6 illustrates an embodiment of a third logic flow.

FIG. 6 depicts an exemplary logic flow, shown as process flow 600, in accordance with some embodiments of the disclosure. The process flow 600 may be implemented by one or more components of the bill payment alert apparatus 102, discussed above. The process flow 600 begins at block 602, subsequent to the operation at block 506.

At block 602, after definition of a geographical footprint for a customer, such as customer1, a payment due date is defined for payments to a provider, based upon a set of customer data records for the provider within the geographical footprint. In particular, the set of customer data records may correspond to all or part of the customers associated with the geographical footprint, and may establish a common payment due date for customers on a common billing cycle, when regular payments are due to the provider. For example, payments for customers of an electric utility may be due the tenth day of each month within the geographical footprint for customer1.

At block 604, a current date is flagged as lying within a predetermined payment interval from the payment due date, identified in block 602. For example, a predetermined interval may be one week before the payment due date. Accordingly, when the current date is the third of the month, a bill payment alert apparatus may make a determination that a payment alert is due to be sent to a customer1.

The flow then proceeds to block 606 where a payment alert may be generated and sent to a customer, alerting the customer of a payment due by the tenth of that month.

Figure 7:
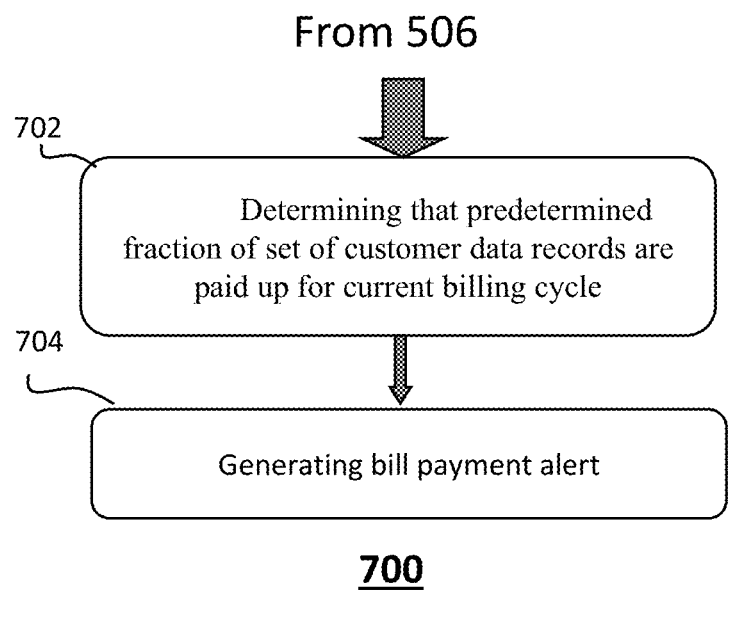
FIG. 7 illustrates an embodiment of a fourth logic flow.

FIG. 7 depicts an exemplary logic flow, shown as process flow 700, in accordance with some embodiments of the disclosure. The process flow 700 may be implemented by one or more components of the bill payment alert apparatus 102, discussed above. The process flow 700 begins at block 702, subsequent to the operation at block 506.

At block 702, an operation is performed to determine current payment information for customers of a provider in a geographical footprint. In particular, the flow determines that a predetermined fraction of a set of customer data records of customers within the geographical footprint are paid up for a current billing cycle for the provider. For example, the customer data records may indicate that as of a current date, 90% of payments have been made to the provider for the current billing cycle in the geographic footprint.

The flow then proceeds to block 704, where a bill payment alert is generated and may be sent to a customer associated with the geographical footprint.

Figure 8:
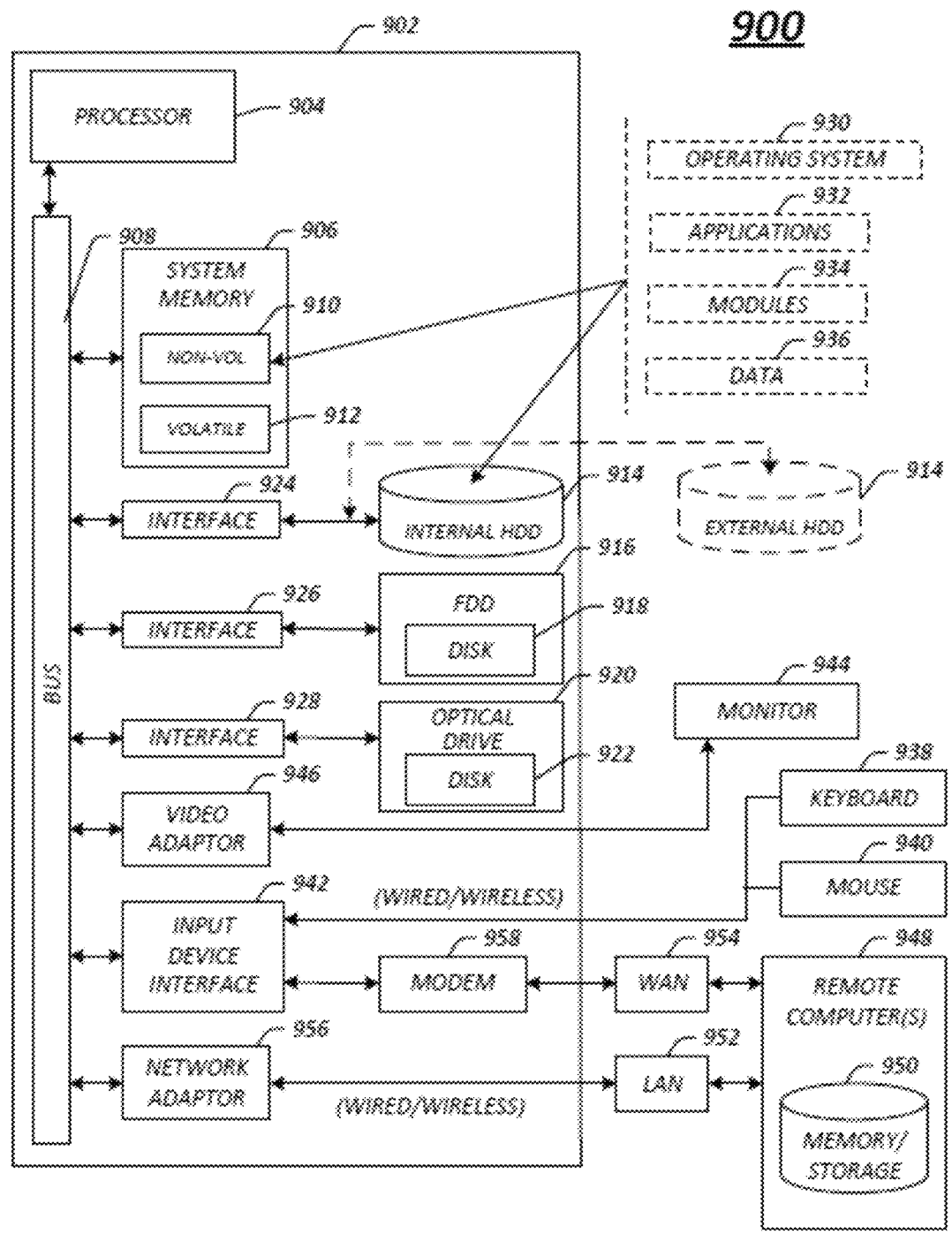
FIG. 8 illustrates an embodiment of a computing architecture.

FIG. 8 illustrates an embodiment of a computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the bill payment alert system 100. More generally, the computing architecture 900 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 8, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units (910, 912), including an operating system 930, one or more application programs 932, other program modules 934, and program data 936. In one embodiment, the one or more application programs 932, other program modules 934, and program data 936 can include, for example, the various applications and/or components of the bill payment alert system 100, e.g., the geographical footprint determination component 112 or threshold determination component 116.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, just a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium, storing computer-readable program code executable by a processor to:
   retrieve a customer data record including a bill payment activity associated with a provider account for a customer of a financial institution;
   define a geographical footprint for the customer by:
      querying a database of customer records of a provider of the provider account, the provider having a plurality of customers;
      identifying, from the queried customer records, an initial customer set including a plurality of geographically proximately-located customers and the customer; and
      iteratively determining, using machine learning based on the initial customer set and a correlation parameter corresponding to a coherence of the initial customer set, a fraction of the customer set, the geographical footprint for the customer, the correlation parameter defining a customer behavior in the customer set and correlating one or more customers in the customer set having a common billing cycle for the provider;
   generate a bill payment alert for transmission to a customer device of the customer via a communications interface, when the bill payment activity meets a threshold condition, wherein the threshold condition is determined at least in part by the geographical footprint;
   provide a software application for execution on the customer device, the software application being associated with the bill payment activity;
   transmit the bill payment alert to the customer device, the bill payment alert automatically triggering execution of the software application, the software application generating a user interface displaying the bill payment alert on the customer device, the user interface embedding one or more selectable icons associated with one or more transmissions of payment in response to the bill payment alert;
   receive, in response to selecting at least one selectable icon in the one or more selectable icons, at least one selection for transmission of payment in response to the bill payment alert from the customer device; and
   transmit, based on the received at least one selection, payment in response to the bill payment alert.

2. The non-transitory computer-readable storage medium of claim 1,
   wherein the bill payment activity comprises a set of billing transactions associated with the provider account for the customer, and
   wherein the bill payment activity includes current payment information for the provider account.

3. The non-transitory computer-readable storage medium of claim 2, the provider account comprising an account associated with an electric utility, a gas utility, a water utility, or an oil utility.

4. The non-transitory computer-readable storage medium of claim 2, the computer-readable program code to determine the threshold condition is met by:
   defining a payment window for payments to the provider, based upon a set of additional customer data records for additional customers within the geographical footprint; and
   determining that a current date lies within a predetermined payment window.

5. The non-transitory computer-readable storage medium of claim 2, the computer-readable program code to determine the threshold condition is met by:
   defining a payment due date for payments to the provider, based upon a set of additional customer data records for additional customers within the geographical footprint; and
   determining that a current date lies within a predetermined payment interval from the payment due date.

6. The non-transitory computer-readable storage medium of claim 2, the computer-readable program code to determine the threshold condition is met by:
   determining that a predetermined fraction of customers of the provider within the geographical footprint are paid up for a current billing cycle, based upon a set of additional customer data records for additional customers within the geographical footprint.

7. The non-transitory computer-readable storage medium of claim 2, wherein the bill payment alert includes payment information for automatic payment from the customer to the provider account.

8. The non-transitory computer-readable storage medium of claim 2, wherein the bill payment alert includes a current customer address query.

9. The non-transitory computer-readable storage medium of claim 1, the computer-readable program code to:

send the bill payment alert for transmission to the customer, via email, text, website, chatbot, or phone transmission.

10. A method of managing bill payments, comprising:
retrieving a customer data record including bill payment activity associated with a provider account for a customer of a financial institution;
defining a geographical footprint of the customer by:
querying a database of customer records of a provider of the provider account, the provider having a plurality of customers;
identifying, from the queried customer records, an initial customer set including a plurality of geographically proximately-located customers and the customer; and
iteratively determining, using machine learning based on the initial customer set and a correlation parameter corresponding to a coherence of the initial customer set, a fraction of the customer set, the geographical footprint for the customer, the correlation parameter defining a customer behavior in the customer set and correlating one or more customers in the customer set having a common billing cycle for the provider; and
generating a bill payment alert for transmission to a customer device of the customer via a communications interface, when the bill payment activity meets a threshold condition, wherein the threshold condition is determined at least in part by the geographical footprint;
providing a software application for execution on the customer device, the software application being associated with the bill payment activity;
transmitting the bill payment alert to the customer device, the bill payment alert automatically triggering execution of the software application, the software application generating a user interface displaying the bill payment alert on the customer device, the user interface embedding one or more selectable icons associated with one or more transmissions of payment in response to the bill payment alert;
receiving, in response to selecting at least one selectable icon in the one or more selectable icons, at least one selection for transmission of payment in response to the bill payment alert from the customer device; and
transmitting, based on the received at least one selection, payment in response to the bill payment alert.

11. The method of claim 10, wherein the bill payment activity comprises a set of billing transactions associated with the provider account for the customer, and wherein the bill payment activity includes current payment information for the provider account.

12. The method of claim 11, the provider account comprising an account associated with an electric utility, a gas utility, a water utility, or an oil utility.

13. The method of claim 11, comprising determining the threshold condition is met by:
defining a payment window for payments to the provider, based upon a set of additional customer data records for additional customers within the geographical footprint; and
determining that a current date lies within a predetermined payment window.

14. The method of claim 11, comprising determining the threshold condition is met by:
defining a payment due date for payments to the provider, based upon a set of additional customer data records for additional customers within the geographical footprint; and
determining that a current date lies within a predetermined payment interval from the payment due date.

15. The method of claim 11, comprising determining the threshold condition is met by:
determining that a predetermined fraction of customers of the provider within the geographical footprint are paid up for a current billing cycle, based upon a set of additional customer data records for additional customers within the geographical footprint.

16. The method of claim 10, wherein the bill payment alert includes one or more of: payment information for automatic payment from the customer to the provider account, and a current customer address query.

17. The method of claim 10, wherein the bill payment alert comprises a selectable menu, including one or more utilities, the one or more utilities including a utility associated with the provider account.

18. A system, comprising:
a processor;
a memory storing instructions executable by the processor to:
periodically retrieve a customer data record including bill payment activity associated with a provider account for a customer of a financial institution;
define a geographical footprint for the customer by:
querying a database of customer records of a provider of the provider account, the provider having a plurality of customers;
identifying, from the queried customer records, an initial customer set including a plurality of geographically proximately-located customers and the customer; and
iteratively determining, using machine learning based on the initial customer set and a correlation parameter corresponding to a coherence of the initial customer set, a fraction of the customer set, the geographical footprint for the customer, the correlation parameter defining a customer behavior in the customer set and correlating one or more customers in the customer set having a common billing cycle for the provider; and
generate a bill payment alert for transmission to a customer device of the customer via a communications interface, when the bill payment activity meets a threshold condition, wherein the threshold condition is determined at least in part by the geographical footprint,
provide a software application for execution on the customer device, the software application being associated with the bill payment activity;
transmit the bill payment alert to the customer device, the bill payment alert automatically triggering execution of the software application, the software application generating a user interface displaying the bill payment alert on the customer device, the user interface embedding one or more selectable icons associated with one or more transmissions of payment in response to the bill payment alert;
receive, in response to selecting at least one selectable icon in the one or more selectable icons, at least one selection for transmission of payment in response to the bill payment alert from the customer device; and transmit, based on the received at least one selection, payment in response to the bill payment alert.

19. The system of claim 18, wherein the bill payment activity comprises a set of billing transactions associated with the provider account of the customer, and wherein the bill payment activity includes current payment information for the provider account.

20. The system of claim 18, the provider account comprising an account associated with an electric utility, a gas utility, a water utility, or an oil utility.

* * * * *